US008110522B2

(12) United States Patent
Meitzner et al.

(10) Patent No.: US 8,110,522 B2
(45) Date of Patent: Feb. 7, 2012

(54) METHODS FOR PROMOTING SYNGAS-TO-ALCOHOL CATALYSTS

(75) Inventors: George Meitzner, Aurora, CO (US); Karl Kharas, Louisville, CO (US)

(73) Assignee: Range Fuels, Inc., Denver, CO (US)

( * ) Notice: Subject to any disclaimer, the term of this patent is extended or adjusted under 35 U.S.C. 154(b) by 42 days.

(21) Appl. No.: 12/565,986

(22) Filed: Sep. 24, 2009

(65) Prior Publication Data

US 2010/0075837 A1    Mar. 25, 2010

Related U.S. Application Data

(60) Provisional application No. 61/100,069, filed on Sep. 25, 2008.

(51) Int. Cl.
*B01J 27/055* (2006.01)
*B01J 27/051* (2006.01)

(52) U.S. Cl. .................................. 502/220; 502/218

(58) Field of Classification Search ............ 502/218, 502/220
See application file for complete search history.

(56) References Cited

U.S. PATENT DOCUMENTS

| 3,769,210 | A | * | 10/1973 | Cais et al. ............... 508/166 |
| 3,933,688 | A | | 1/1976 | Dines |
| 4,049,879 | A | * | 9/1977 | Thompson et al. ........ 429/320 |
| 4,224,390 | A | | 9/1980 | Haering et al. |
| 4,233,377 | A | * | 11/1980 | Haering et al. ........... 429/231.1 |
| 4,299,892 | A | * | 11/1981 | Dines et al. ............... 429/324 |
| 4,323,480 | A | * | 4/1982 | Dines et al. ............... 502/215 |
| 4,542,009 | A | | 9/1985 | Palmer |
| 4,576,697 | A | | 3/1986 | Palmer |
| 4,822,590 | A | | 4/1989 | Morrison et al. |
| 4,853,359 | A | * | 8/1989 | Morrison et al. .......... 502/220 |
| 4,996,108 | A | * | 2/1991 | Divigalpitiya et al. .... 428/411.1 |
| 5,072,886 | A | | 12/1991 | Morrison et al. |
| 6,217,843 | B1 | * | 4/2001 | Homyonfer et al. ....... 423/593.1 |
| 7,060,650 | B2 | | 6/2006 | Rendina |
| 7,393,516 | B2 | * | 7/2008 | Seo et al. .................. 423/508 |

FOREIGN PATENT DOCUMENTS

WO    2010/036848    *  1/2010

OTHER PUBLICATIONS

"Intercalation chemistry of molybdenum disulfide," E. Benavente et al. Coordination Chemistry Reviews 224 (2002), pp. 87-109.*
Joy Heising et al., "Exfoliated and Restacked MoS2 and WS2: Ionic or Neutral Species? Encapsulation and Ordering of Hard Electropositive Cations", J. Am. Chem. Soc., vol. 121, pp. 11720-11732 (1999).
Jae Sung Lee et al., "Role of Alkali Promoters in K/MoS2 Catalysts for CO-H2 Reactions", Applied Catalysis A: General 110 (1994) 11-25.
Intercalated Layered Materials, edited by F. Levy (1979).
W. Rudorff, Chimia, vol. 19 (1965).

(Continued)

*Primary Examiner* — Patricia L Hailey
(74) *Attorney, Agent, or Firm* — O'Connor & Company; Ryan P. O'Connor

(57) ABSTRACT

The present invention provides methods of intercalating a catalyst promoter to form a catalyst composition suitable for converting syngas into alcohols, such as ethanol. Effective conditions for promoter intercalation are provided herein. This invention also provides novel compositions that can be characterized by interplanar spacings of the promoter within the catalyst composition.

33 Claims, 1 Drawing Sheet

OTHER PUBLICATIONS

M. Stanley Whittingham, "Chemistry of Intercalation Compounds: Metal Guests in Chalcogenide Hosts", Prog. Solid St. Chem., vol. 12, pp. 41-99 (1978).

D. Yang et al., "Li-Intercalation and Exfoliation of Ws2", J. Phys. Chem. Solids, vol. 57, Nos. 6-8, pp. 1113-1116 (1996).

* cited by examiner

METHODS FOR PROMOTING SYNGAS-TO-ALCOHOL CATALYSTS

PRIORITY DATA

This patent application claims priority under 35 U.S.C. §120 from U.S. Provisional Patent Application No. 61/100,069 for "METHODS FOR PROMOTING SYNGAS-TO-ALCOHOL CATALYSTS," filed Sep. 25, 2008, the disclosure of which is hereby incorporated by reference herein for all purposes.

FIELD OF THE INVENTION

The present invention generally relates to the field of heterogeneous catalysts, and more specifically to methods of adding promoters to these catalysts.

BACKGROUND OF THE INVENTION

The layered transition-metal dichalcogenides have applications in areas as diverse as lubrication, electrochemistry, and catalysis. For example, the lubricity of the layered compound molybdenum disulfide, $MoS_2$, stems from the weak bonding between adjacent basal planes. Molybdenum disulfide is a known catalyst for conversion of syngas to hydrocarbons plus carbon dioxide and water. When certain alkali salts (base promoters) are added, the catalyst selectivity is altered to direct syngas toward alcohols. Under appropriate conditions, the product alcohols comprise primarily methanol and ethanol. The base promoter can be an anionic, cationic, or molecular species. A typical base promoter is an alkali metal, such as potassium. The deposition process is usually intended to disperse the promoter broadly and uniformly. However, good distribution of base promoters can be difficult.

Components, such as base promoters, can be introduced into transition-metal dichalcogenides (such as $MoS_2$) in a number of ways. It is known that cations or neutral molecules can be inserted between $MoS_2$ sheets (Whittingham, *Prog. Solid St. Chem.*, 12, 41-99, 1978).

For example, lithium can be introduced or "intercalated" by soaking the layered compound in a solution of n-butyllithium in hexane, as described by M. B. Dines in U.S. Pat. No. 3,933,688, issued in 1976. Other prior methods of obtaining a layered compound with alkali metal between the layers are, for example, intercalation of the transition metal dichalcogenide with the alkali metal from solution in liquid ammonia as described by W. Rudorff in *Chimia*, Vol. 19 (1965); or by electrointercalation in an electrochemical cell as described by R. R. Haering et al. in U.S. Pat. No. 4,224,390, issued in 1980; or by exposing the layered compound to hot alkali metal vapors as described in *Intercalated Layered Materials*, edited by F. Levy (1979).

Another method starts from $MoS_2$ containing intercalated $Li^+$. In water, the Li—$MoS_2$ can exfoliate into detached sheets. These sheets will spontaneously restack when the solvent is removed, but with molecules or cations trapped between the layers (Yang and Frindt, *J. Phys. Chem. Solids*, 57, 1113-1116 (1996); Heising and Kanatzidis, *J. Am. Chem. Soc.*, 121, 11720-11732 (1999)).

U.S. Pat. Nos. 4,822,590 and 5,072,886, to Morrison et al., disclose how layered or porous materials intercalated with alkali metals may be fractured into higher-surface-area materials by immersing the intercalated material in a liquid that generates a gas upon reaction with the alkali metal. It is suggested that the fractured materials may be useful in catalysis.

The aforementioned methods of intercalating transition-metal dichalcogenides can be impractical or costly. In light of the shortcomings in the art, what is desired is an intercalation approach that can be more efficient and/or more practical. When alcohols are desired from syngas, via base-promoted catalysis, it would be especially convenient to add a base promoter by dry-mixing the promoter and catalyst precursor solids. Suitable in situ or ex situ conditions for intercalation of the base promote are needed, wherein the promoter migrates as it is melted, volatilized, or otherwise rendered mobile.

SUMMARY OF THE INVENTION

In some embodiments of the present invention, methods of intercalating a promoter to form a catalyst composition are provided, the methods comprising:
(a) providing a starting composition comprising a transition-metal chalcogenide;
(b) providing a promoter comprising one or more elements selected from the group consisting of potassium, cesium, barium, strontium, scandium, yttrium, lanthanum, and cerium;
(c) combining at least some of the starting composition with at least some of the promoter, thereby producing a precursor composition; and
(d) subjecting the precursor composition to effective conditions for intercalating the promoter, thereby producing a catalyst composition.

The transition metal can be selected from Group IVB, VB, VIB, or VIIB. In some embodiments, the chalcogenide comprises sulfur (e.g., $MoS_2$). In certain embodiments, the promoter comprises $K_2CO_3$ and/or $Cs_2CO_3$.

Effective conditions in step (d) include a temperature selected from about 200-400° C., such as about 280-350° C. Effective conditions in step (d) include a pressure selected from about 0.1-200 atm, such as about 1-100 atm.

In some embodiments, effective conditions in step (d) include a reducing atmosphere. In certain embodiments, for example, step (d) can include a gas composition comprising hydrogen and carbon monoxide. The $H_2$/CO ratio of this composition can vary, for example from about 0.1-10 or 0.5-2.

Effective conditions in step (d) include an intercalation time of at least 1 hour, at least 10 hours, or at least 100 hours.

Step (d) can be conducted in situ, ex situ, or both in situ and ex situ. Conditions in step (d), in some embodiments, are also suitable for alcohol synthesis from syngas over the catalyst composition.

In some embodiments of the invention employing $K_2CO_3$, during step (d), the interplanar spacing of $MoS_2$ increases by at least 1 Å. In some of these embodiments, the interplanar spacing of $MoS_2$ increases by less than 2 Å. The $MoS_2$ interplanar spacing associated with the catalyst composition, in some embodiments employing $K_2CO_3$, is between about 7 Å and about 8 Å. In certain embodiments, the $MoS_2$ interplanar spacing is between about 7.4 Å and about 7.8 Å.

In some embodiments of the invention employing $Cs_2CO_3$, during step (d), the interplanar spacing of $MoS_2$ increases by at least 0.3 Å. In some of these embodiments, the interplanar spacing of $MoS_2$ increases by less than 0.6 Å. The $MoS_2$ interplanar spacing associated with the catalyst composition, in some embodiments employing $Cs_2CO_3$, is between about 8.0 Å and about 8.8 Å.

In some variations of the invention, methods further include subjecting the catalyst composition to syngas under suitable reactor conditions for producing at least one $C_1$-$C_4$ alcohol, such as ethanol.

Another aspect of the present invention relates to novel compositions produced by any of the methods provided. These compositions can be defined by the process to produce them, and they can also be characterized by certain interplanar spacings that can be measured by, for example, XRD.

In some embodiments, a composition is provided that comprises $MoS_2$, Co, and K, wherein the K is intercalated in layers of the $MoS_2$ having an interplanar spacing of about 7 Å to about 8 Å, such as about 7.4-7.8 Å (e.g., about 7.6 Å).

In some embodiments, a composition is provided that comprises $MoS_2$, Co, and Cs, wherein the Cs is intercalated in layers of the $MoS_2$ having an interplanar spacing of about 8.0 Å to about 8.8 Å, such as about 8.3-8.6 Å (e.g., about 8.5 Å).

DETAILED DESCRIPTION OF EMBODIMENTS OF THE INVENTION

Figure 1:
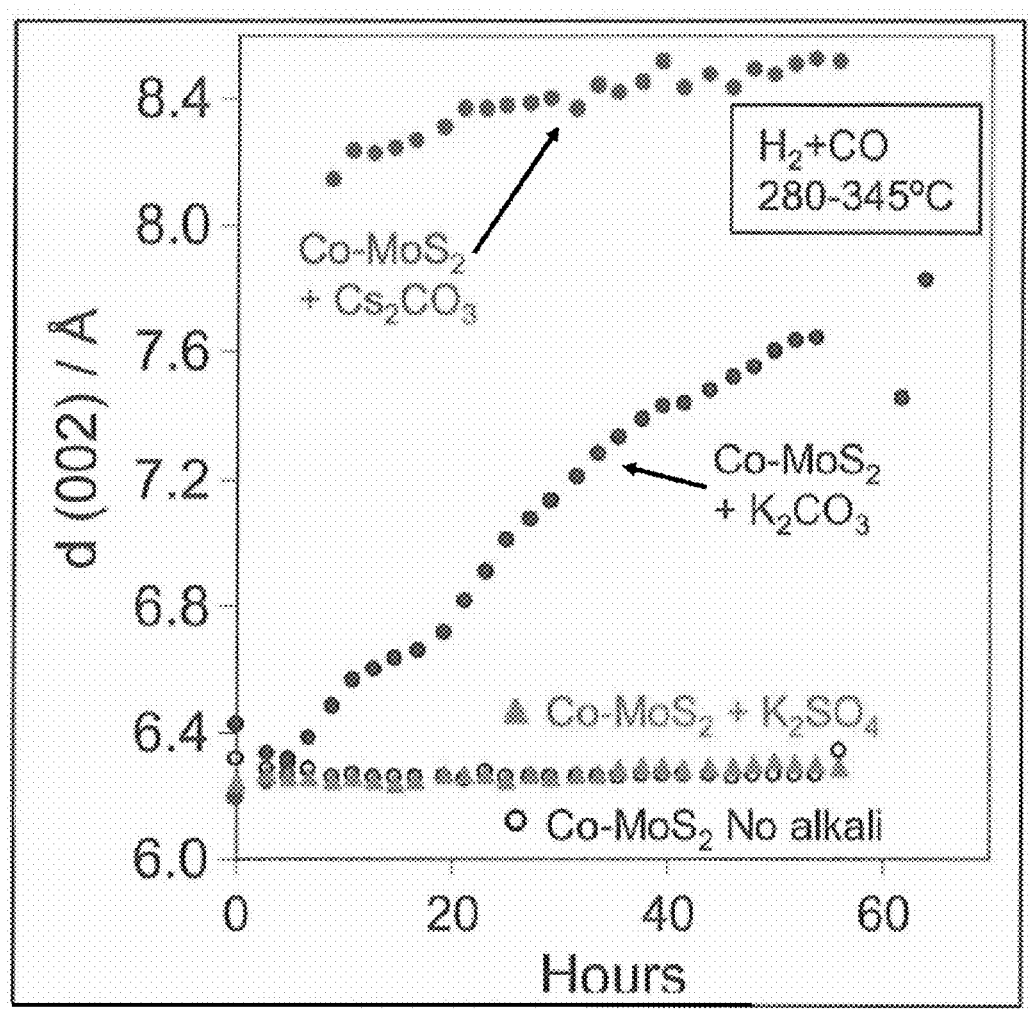
FIG. 1 depicts $MoS_2$ spacings as measured by XRD for Co—$MoS_2$ intercalated by various species, according to some embodiments.

This description will enable one skilled in the art to make and use the invention, and it describes several embodiments, adaptations, variations, alternatives, and uses of the invention, including what is presently believed to be the best mode of carrying out the invention.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used herein, "$C_1$-$C_4$ alcohols" means one or more alcohols selected from methanol, ethanol, propanol, and butanol, including all known isomers of such compounds.

The present invention will now be described by reference to the following detailed description which characterizes and illustrates some preferred embodiments for producing ethanol. This description by no means limits the scope and spirit of the present invention. For example, although certain embodiments will be described by reference to $MoS_2$, the invention is by no means limited to intercalation of promoters into $MoS_2$.

"Intercalation," as used herein, means the reversible inclusion of an atom, molecule, or group of molecules between two other molecules or groups of molecules. Intercalation compounds generally comprise two components: a host material and a visiting insertion material. Host intercalation materials may be elements, naturally occurring intermetallic compounds, or synthetic structures that allow the reversible insertion of ions, atoms, or molecules of another material within spaces in the host structure.

Molybdenum disulfide has a layered crystal structure. Each layer comprises a hexagonal array of Mo(IV) cations with each cation at the center of a trigonal prism of $S^{2-}$ anions. Thus, each $MoS_2$ sheet is itself a plane of molybdenum cations covalently bonded to planes of sulfides above and below. In bulk $MoS_2$, these sandwich sheets are stacked and held together by weak Van der Waals forces.

The present invention is partly premised on the discovery that the interplanar spacing of $MoS_2$ in formulated catalysts can expand, via intercalation, under certain conditions.

$MoS_2$ can be an effective catalyst for synthesis of alcohols, such as methanol or ethanol, when it is promoted by certain compounds of alkali metals. In various embodiments of the invention, a base promoter may be present in free or combined form. The base promoter can be present as a metal, oxide, carbonate, hydroxide, sulfide, as a salt, in a compound with another component, or some combination of these. Typically, for reasons of convenience and/or cost, base promoters are in compound form rather than pure elements.

In some embodiments, at least one base promoter includes potassium or cesium. In some embodiments, at least one base promoter includes one or more elements selected from the group consisting of barium, strontium, scandium, yttrium, lanthanum, or cerium, in free or combined form. Due to the higher valence of these base promoters, the elemental forms of these metals—or their corresponding salts, oxides, or sulfides—will typically not very volatile. Lower volatility can be preferred, in some embodiments.

When an alkali salt is employed as a base promoter, the cation efficacy can depend on the identity of the corresponding anion. For purposes of illustration, when potassium is desired, it is preferable to employ $K_2CO_3$ rather than $K_2SO_4$ (as shown in FIG. 1). Lower anion stability is preferred to help the alkali ($K^+$) to react or migrate, and it is believed that the $SO_4^{2-}$ anion is more stable than the $CO_3^{2-}$ anion under suitable intercalation conditions.

The base promoter is generally initially present in an amount of at least 0.1-20 wt % in the catalyst composition. Preferably, the base promoter is initially present in an amount of at least 5 wt %.

Other layered transition-metal sulfides formed by metals from groups IVB, VB, VIIB and VIIB may also become effective catalysts for alcohol synthesis from syngas if a suitable cationic promoter is intercalated using the methods described herein.

In one variation of the invention, $MoS_2$ (or the $MoS_2$ component of a catalyst composition) is compounded with $K_2CO_3$. The $MoS_2$—$K_2CO_3$ mixture is then subjected to suitable conditions of temperature, pressure, gas composition, and time, such conditions described below in more detail.

In preferred methods, the $MoS_2$—$K_2CO_3$ mixture is treated at an intercalation temperature of at least about 200° C., preferably at least about 280° C. and less than about 400° C., and more preferably selected from about 280-350° C.

In preferred methods, the $MoS_2$—$K_2CO_3$ mixture is treated at a total pressure selected from about 0.1 atm to about 200 atm, more preferably selected from about 1-100 atm. It can be preferable, for convenience, to conduct the intercalation at a pressure at or near atmospheric pressure.

In preferred methods, the $MoS_2$—$K_2CO_3$ mixture is subjected to a reducing atmosphere, more preferably a strongly reducing atmosphere. In some preferred methods, the $MoS_2$—$K_2CO_3$ mixture is subjected to a gas composition comprising hydrogen ($H_2$) and carbon monoxide (CO). The gas can be syngas or a stream comprising syngas. The molar ratio of hydrogen to carbon monoxide, $H_2$/CO, in the gas composition can be selected from about 0.1 to about 10, preferably selected from about 0.5-2, and more preferably about 1. The gas composition can also contain other gases besides $H_2$ and CO, such as $CO_2$, $H_2O$, inert gases, trace contaminants, and so on.

In preferred methods, the $MoS_2$—$K_2CO_3$ mixture is treated for an intercalation time of at least about 1 hour, preferably at least about 10 hours, such as 25, 50, 75, 100 or more hours. As will be recognized by a skilled artisan, for a desired degree of intercalation, there will generally be a minimum time as a function of temperature, pressure, and composition. Longer times can certainly be employed, if desired, but it is not preferred to treat the $MoS_2$—$K_2CO_3$ mixture for excessive times.

In some embodiments, the intercalation is conducted in situ, i.e. with the starting catalyst composition contained within a reactor. In other embodiments, the intercalation is conducted ex situ, i.e. outside of the reactor, under effective conditions as described herein. In some embodiments, the intercalation is conducted, to varying extents, both ex situ and in situ.

In a preferred embodiment, the $MoS_2$—$K_2CO_3$ mixture is treated, at least in part, under in situ conditions that are suitable for both intercalation as well as effective for alcohol synthesis from syngas over the ultimate catalyst (wherein the base promoter is effectively intercalated). Conditions that are suitable for alcohols, such as $C_1$-$C_4$ alcohols, from syngas are described in detail below.

The extent of intercalation can be observed by a variety of means, including measurements of the swelling of the catalyst material. Swelling can be a consequence of expansion of the spacing between the $MoS_2$ planes, resulting from insertion of alkali cations. Intercalation can also be observed by analytical techniques, such as X-ray powder diffraction (XRD).

It is believed, without limitation of the invention, that $K_2CO_3$ is an effective promoter because under in situ conditions water and/or transient Brønsted acid sites mediate the decomposition of the carbonate yielding very reactive $K_2O$ or KOH. Anions that are stable under these conditions, including $SO_4^{2-}$, prevent the alkali from reacting or migrating. Anions that can allow the $K^+$ to react with the $MoS_2$ preferably include, for example, $CO_3^{2-}$, $O^{2-}$, $OH^-$, $C_2O_2^{2-}$, $C_2^{2-}$, and acetoxy anion ($OAc^-$) but not $SO_4^{2-}$, $NO_3^-$, or $Cl^-$.

Having entered and expanded the space between the layers of the transition metal sulfide, the cation still requires charge balance. Such balancing may be accomplished by depositing a negative charge onto the $MoS_2$. The charge might be dispersed, localized on a sulfide anion, or transferred to an adsorbed hydroxyl group. The selectivity of the promoted sulfide catalyst, for alcohols rather than hydrocarbons, might result from the ability to terminate chain growth by addition of one of these surface hydroxyl groups, rather than a hydride or surface carbon species.

Another aspect of the invention provides for use of catalyst materials produced, in a reactor for synthesis of alcohols, preferably $C_1$-$C_4$ alcohols, such as ethanol.

The reactor is any apparatus capable of being effective for producing at least one $C_1$-$C_4$ alcohol from the syngas stream fed. The reactor can be a single vessel or a plurality of vessels. The reactor contains at least one catalyst composition that tends to catalyze the conversion of syngas into alcohols. The "reactor" can actually be a series or network of several reactors in various arrangements. For example, in some variations, the reactor comprises a large number of tubes filled with one or more catalysts as provided herein.

The reactor for converting syngas into alcohols can be engineered and operated in a wide variety of ways. The reactor operation can be continuous, semicontinuous, or batch. Operation that is substantially continuous and at steady state is preferable. The flow pattern can be substantially plug flow, substantially well-mixed, or a flow pattern between these extremes. The flow direction can be vertical-upflow, vertical-downflow, or horizontal. A vertical configuration can be preferable.

In some embodiments, fresh syngas is produced according to methods described in Klepper et al., "Methods and apparatus for producing syngas," U.S. patent application Ser. No. 12/166,167 (filed Jul. 1, 2008), the assignee of which is the same as the assignee of the present application. U.S. patent application Ser. No. 12/166,167 is hereby incorporated by reference herein in its entirety.

Any suitable catalyst or combination of catalysts may be used in a reactor to catalyze reactions converting syngas to alcohols. Suitable catalysts may include, but are not limited to, those disclosed in U.S. patent application Ser. No. 12/166,167. Preferred catalysts minimize the formation of $CO_2$ and $CH_4$ under reaction conditions. Certain catalysts that can be used include Co—Mo—S materials promoted with potassium, which can be delivered (via precursor $K_2CO_3$) as described herein.

In some embodiments, conditions effective for producing alcohols from syngas include a feed hydrogen-carbon monoxide molar ratio ($H_2$/CO) from about 0.2-4.0, preferably about 0.5-2.0, and more preferably about 0.5-1.5. These ratios are indicative of certain embodiments and are not limiting. It is possible to operate at feed $H_2$/CO ratios less than 0.2 as well as greater than 4, including 5, 10, or even higher. It is well-known that high $H_2$/CO ratios can be obtained with extensive steam reforming and/or water-gas shift in operations prior to the syngas-to-alcohol reactor.

In some embodiments, conditions effective for producing alcohols from syngas include reactor temperatures from about 200-400° C., preferably about 250-350° C. Depending on the catalyst chosen, changes to reactor temperature can change conversions, selectivities, and catalyst stability. As is recognized in the art, increasing temperatures can sometimes be used to compensate for reduced catalyst activity over long operating times.

Preferably, the syngas entering the reactor is compressed. Conditions effective for producing alcohols from syngas include reactor pressures from about 20-500 atm, preferably about 50-200 atm or higher. Generally, productivity increases with increasing reactor pressure, and pressures outside of these ranges can be employed with varying effectiveness.

In some embodiments, conditions effective for producing alcohols from syngas include average reactor residence times from about 0.1-10 seconds, preferably about 0.5-2 seconds. "Average reactor residence time" is the mean of the residence-time distribution of the reactor contents under actual operating conditions. Catalyst contact times can also be calculated by a skilled artisan and these times will typically also be in the range of 0.1-10 seconds, although it will be appreciated that it is certainly possible to operate at shorter or longer times.

The catalyst phase can be a packed bed or a fluidized bed. The catalyst particles can be sized and configured such that the chemistry is, in some embodiments, mass-transfer-limited or kinetically limited. The catalyst can take the form of a powder, pellets, granules, beads, extrudates, and so on. When a catalyst support is optionally employed, the support may assume any physical form such as pellets, spheres, monolithic channels, etc. The supports may be coprecipitated with active metal species; or the support may be treated with the catalytic metal species and then used as is or formed into the aforementioned shapes; or the support may be formed into the aforementioned shapes and then treated with the catalytic species.

In general, the specific selection of catalyst configuration (geometry), $H_2/CO$ ratio, temperature, pressure, and residence time (or feed rate) will be selected to provide, or will be subject to constraints relating to, an economically optimized process. The plurality of reactor variables and other system parameters can be optimized, in whole or in part, by a variety of means.

Certain embodiments and aspects of the present invention will now be further described by way of the following example.

EXAMPLE

A series of catalysts are prepared wherein the catalyst composition comprises Co and Mo, combined with atomic ratio of Co to Mo of about 0.5. The catalyst composition also comprises sulfur, in an atomic ratio of S to (Co+Mo) of about 2. Different samples of this same starting Co—$MoS_2$ catalyst composition are then combined with $K_2CO_3$, $Cs_2CO_3$, $K_2SO_4$, and no alkali (control).

These four catalyst compositions are then subjected to a method of the invention, wherein the intercalation conditions are as follows: temperature of 280-345° C.; pressure of 1 atm; $H_2/CO=1$; and time up to about 60 hours.

As depicted in FIG. 1, under these conditions, swelling with a $K_2CO_3$ promoter continues over 60 hrs. The greater extent of swelling with a $Cs_2CO_3$ promoter has almost stabilized within 10 hrs. Very little swelling occurs when the Co—$MoS_2$ powder comprising the catalyst and containing the $MoS_2$ is heated with $K_2SO_4$, which is regarded as a poor base promoter (Lee et al., *Appl. Catal. A*, 110, 11-25, 1994). No swelling occurs if the catalyst powder without alkali is heated.

FIG. 1 shows the separation between $MoS_2$ layers, calculated from the position of the $MoS_2$ (002) diffraction line by XRD (Cu Kα) according to Bragg's Law $\lambda=2d \sin \theta$. In Bragg's Law λ is the wavelength of the probe X-rays, θ is the angular direction of the diffraction line, and d is the interplanar spacing.

The suitable base promoters $K_2CO_3$ and $Cs_2CO_3$ swell the $MoS_2$, indicating effective intercalation chemistry, but the poor promoter $K_2SO_4$ swells $MoS_2$ much less, if at all.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A method of intercalating a promoter to form a catalyst composition, said method comprising:
    (a) providing a starting composition comprising a transition-metal chalcogenide;
    (b) providing a promoter comprising one or more elements selected from the group consisting of potassium, rubidium, cesium, barium, strontium, scandium, yttrium, lanthanum, and cerium;
    (c) combining at least some of said starting composition with at least some of said promoter, thereby producing a precursor composition; and
    (d) subjecting said precursor composition to effective conditions, including a reducing atmosphere, for intercalating said promoter, thereby producing a catalyst composition.

2. The method of claim 1, wherein said transition metal is selected from Group IVB, VB, VIB, or VIIB.

3. The method of claim 1, wherein said chalcogenide comprises sulfur.

4. The method of claim 1, wherein said transition-metal chalcogenide is $MoS_2$.

5. The method of claim 4 wherein said promoter comprises $K_2CO_3$.

6. The method of claim 5, wherein during step (d), the interplanar spacing of $MoS_2$ increases by at least 1 Å.

7. The method of claim 6, wherein said interplanar spacing increases by less than 2 Å.

8. The method of claim 5, wherein the $MoS_2$ interplanar spacing associated with said catalyst composition is between about 7 Å and about 8 Å.

9. The method of claim 8, wherein said $MoS_2$ interplanar spacing is between about 7.4 Å and about 7.8 Å.

10. The method of claim 4, wherein said promoter comprises $Cs_2CO_3$.

11. The method of claim 10, wherein during step (d), the interplanar spacing of $MoS_2$ increases by at least 0.3 Å.

12. The method of claim 11, wherein said interplanar spacing increases by less than 0.6 Å.

13. The method of claim 10, wherein the $MoS_2$ interplanar spacing associated with said catalyst composition is between about 8.0 Å and about 8.8 Å.

14. The method of claim 1, wherein said effective conditions in step (d) include a temperature selected from about 200-400° C.

15. The method of claim 14, wherein said temperature is selected from about 280-350° C.

16. The method of claim 1, wherein said effective conditions in step (d) include a pressure selected from about 0.1-200 atm.

17. The method of claim 16, wherein said pressure is selected from about 1-100 atm.

18. The method of claim 1, wherein said effective conditions in step (d) include a gas composition comprising hydrogen ($H_2$) and carbon monoxide (CO).

19. The method of claim 18, wherein the molar ratio of hydrogen to carbon monoxide in said gas composition is selected from about 0.1-10.

20. The method of claim 1, wherein said effective conditions in step (d) include a gas composition comprising hydrogen ($H_2$) but not carbon monoxide (CO).

21. The method of claim 1, wherein said effective conditions in step (d) include an intercalation time of at least 1 hour.

22. The method of claim 21, wherein said intercalation time is at least 10 hours.

23. The method of claim 21, wherein said intercalation time is less than 100 hours.

24. The method of claim 1, wherein said effective conditions in step (d) are provided in situ.

25. The method of claim 1, wherein said effective conditions in step (d) are provided ex situ.

26. The method of claim 1, wherein said effective conditions in step (d) are suitable for alcohol synthesis from syngas over said catalyst composition.

27. The method of claim 1, wherein said starting composition further comprises cobalt.

28. A composition comprising $MoS_2$, Co, and K, wherein said K is intercalated in layers of said $MoS_2$ having an interplanar spacing of about 7 Å to about 8 Å.

29. The composition of claim 28, wherein said interplanar spacing is about 7.4 Å to about 7.8 Å.

30. The composition of claim 29, wherein said interplanar spacing is about 7.6 Å.

31. A composition comprising $MoS_2$, Co, and Cs, wherein said Cs is intercalated in layers of said $MoS_2$ having an interplanar spacing of about 8.0 Å to about 8.8 Å.

32. The composition of claim 31, wherein said interplanar spacing is about 8.3 Å to about 8.6 Å.

33. The composition of claim 32, wherein said interplanar spacing is about 8.5 Å.

* * * * *